(12) United States Patent
Lee (10) Patent No.: US 10,597,067 B2
(45) Date of Patent: Mar. 24, 2020

(54) MINIATURE VEHICLE WITH FOOT STEERING ARRANGEMENT

(71) Applicant: UPRIGHT MANUFACTURERS (SHENZHEN) LTD, Shenzhen (CN)

(72) Inventor: Hung-Chia Lee, Shenzhen (CN)

(73) Assignee: UPRIGHT MANUFACTURERS (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/012,787

(22) Filed: Jun. 20, 2018

(65) Prior Publication Data

US 2019/0359246 A1 Nov. 28, 2019

(30) Foreign Application Priority Data

May 22, 2018 (CN) .......................... 2018 1 0495675
May 22, 2018 (CN) .......................... 2018 2 0770719

(51) Int. Cl.

| | | |
|---|---|---|
| B62D 1/22 | (2006.01) | |
| B60K 1/00 | (2006.01) | |
| B62D 11/00 | (2006.01) | |
| B60N 2/22 | (2006.01) | |
| B62D 21/04 | (2006.01) | |
| B62D 21/14 | (2006.01) | |
| B60K 26/02 | (2006.01) | |
| B60N 3/02 | (2006.01) | |
| B60T 11/04 | (2006.01) | |
| B60T 11/08 | (2006.01) | |
| B60T 7/10 | (2006.01) | |

(52) U.S. Cl.
CPC .................. *B62D 1/22* (2013.01); *B60K 1/00* (2013.01); *B60K 26/02* (2013.01); *B60N 2/22* (2013.01); *B60N 3/02* (2013.01); *B60T 7/102* (2013.01); *B60T 11/046* (2013.01); *B60T 11/08* (2013.01); *B62D 11/00* (2013.01); *B62D 21/04* (2013.01); *B62D 21/14* (2013.01); *B60N 2002/2204* (2013.01)

(58) Field of Classification Search
CPC . B62D 1/00; B62D 1/22; B62D 11/00; B62D 21/04; B62D 21/14; B60K 1/00; B60K 26/02; B60N 2/22; B60N 3/02; B60N 2002/2204; B60T 7/102; B60T 11/046; B60T 11/08
USPC ............................................... 180/291
See application file for complete search history.

(56) References Cited

U.S. PATENT DOCUMENTS

| 2,903,082 A | * | 9/1959 | Marcus ..................... B62B 3/12 |
| | | | 180/19.1 |
| 3,207,528 A | * | 9/1965 | Hasche ................. B60N 2/286 |
| | | | 280/47.38 |
| 4,592,570 A | * | 6/1986 | Nassiri ..................... A61G 5/00 |
| | | | 280/250.1 |
| 4,749,207 A | * | 6/1988 | Oh .......................... B62M 1/14 |
| | | | 280/247 |

(Continued)

*Primary Examiner* — John D Walters
(74) *Attorney, Agent, or Firm* — Raymond Y. Chan; David and Raymond Patent Firm (57) ABSTRACT

A miniature vehicle includes a chassis frame, front and rear wheel assemblies operatively coupled at front and rear ends of the chassis frame respectively, a motorized assembly supported on the chassis frame to power the rear wheel assembly, and a foot steering arrangement operatively coupled to the front wheel assembly. Therefore, the user is able to control the miniature vehicle by the feet of the user to precisely steer and control the miniature vehicle.

6 Claims, 10 Drawing Sheets

(56) References Cited

U.S. PATENT DOCUMENTS

| | | | | |
|---|---|---|---|---|
| 6,273,212 B1* | 8/2001 | Husted | ............... | A61G 5/045 |
| | | | | 180/221 |
| 8,210,295 B2* | 7/2012 | Kuramoto | ............ | A61G 5/045 |
| | | | | 180/65.1 |
| 8,936,262 B2* | 1/2015 | Nabeta | ................ | A61H 3/04 |
| | | | | 135/67 |
| 9,033,356 B2* | 5/2015 | Xiao | .................. | B62M 1/24 |
| | | | | 280/253 |
| 2017/0072989 A1* | 3/2017 | Moujoud | ............ | B62K 5/007 |

* cited by examiner

MINIATURE VEHICLE WITH FOOT STEERING ARRANGEMENT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of miniature vehicles, and more particularly to a miniature vehicle with a foot steering arrangement, wherein the user is able to steer the miniature vehicle by the feet of user so as to enhance the precise steering control of the miniature vehicle.

Description of Related Arts

Go-karts or miniature motorized vehicles are well known in the art. The conventional go-kart comprises a chassis having a seat frame for a user sitting thereon, a combustion engine supported by the chassis, and a control system. The control system comprises a foot gas pedal and a foot brake pedal for allowing the user to control a speed of the go-kart via the feet of the user, and a steering wheel held by the user's hand for controlling the direction of the go-kart.

The main feature of the go-kart is that the go-kart has the ability to traverse the ground at an apparent high rate of speed relative to the proximity to the ground. However, the component-arrangement of the go-kart is not ergonomically designed to lower the center of mass of the user during driving the go-kart. It is because the user must sit upright in order for the hands of the user to reach the steering wheel. In other words, in response to the sitting position of the user, it is unsafe or unstable to drive the go-kart during cornering. In addition, the size of the chassis is fixed and is non-adjustable. Therefore, a short user may not able to reach the foot gas pedal and the foot brake pedal when the user sits on the seat frame. Likewise, a tall user may need to bend his or her feet to reach the foot gas pedal and the foot brake pedal.

SUMMARY OF THE PRESENT INVENTION

The invention is advantageous in that it provides a miniature vehicle, such as a go-kart, with a foot steering arrangement, wherein the user is able to steer the miniature vehicle as a ground vehicle by the feet of user so as to enhance the precise steering control of the miniature vehicle.

Another advantage of the invention is to provide a miniature vehicle with a foot steering arrangement, wherein the foot steering arrangement is located at the very front end of the miniature vehicle, such that the user is able to precisely steer and control the miniature vehicle.

Another advantage of the invention is to provide a miniature vehicle with a foot steering arrangement, wherein the user sitting position is optimized in an ergonomically designed manner to lower the center of mass of the miniature vehicle with the user sitting thereon.

Another advantage of the invention is to provide a miniature vehicle with a foot steering arrangement, which is a rear wheel drive vehicle that provides a better balance and a better acceleration.

Another advantage of the invention is to provide a miniature vehicle with a foot steering arrangement, which can be powered by an electric motor, such that the miniature vehicle is an environment friendly vehicle.

Another advantage of the invention is to provide a miniature vehicle with a foot steering arrangement, wherein the brake adjustment is easy to do by the user to have a tighten brake feel or loosen brake feel.

Another advantage of the invention is to provide a miniature vehicle with a foot steering arrangement, wherein the length of the chassis frame is adjustable to fit different user's height.

Another advantage of the invention is to provide a miniature vehicle with a foot steering arrangement, wherein no expensive or complicated structure is required to employ in the present invention in order to achieve the above mentioned objects.

Therefore, the present invention successfully provides an economic and efficient solution for providing simple and precise steering configuration for the miniature vehicle.

Additional advantages and features of the invention will become apparent from the description which follows, and may be realized by means of the instrumentalities and combinations particular point out in the appended claims.

According to the present invention, the foregoing and other objects and advantages are attained by a miniature vehicle, comprising:

a vehicle frame which comprises a chassis frame and a seat frame supported thereon for a user sitting on the seat frame;

front and rear wheel assemblies operatively coupled at front and rear ends of the chassis frame respectively;

a motorized assembly supported on the chassis frame to power the rear wheel assembly; and a foot steering arrangement operatively coupled to the front wheel assembly for steering operation by feet of the user.

In accordance with another aspect of the invention, the present invention comprises a miniature vehicle, comprising:

a vehicle frame which comprises a chassis frame and a seat frame supported thereon for a user sitting on the seat frame;

a wheel assembly operatively coupled at the chassis frame;

a motorized assembly supported on the chassis frame to power the wheel assembly;

a hand operational control operatively linked to the motorized assembly for speed control by hands of the user; and a foot steering arrangement operatively coupled to the wheel assembly for steering operation by feet of the user.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
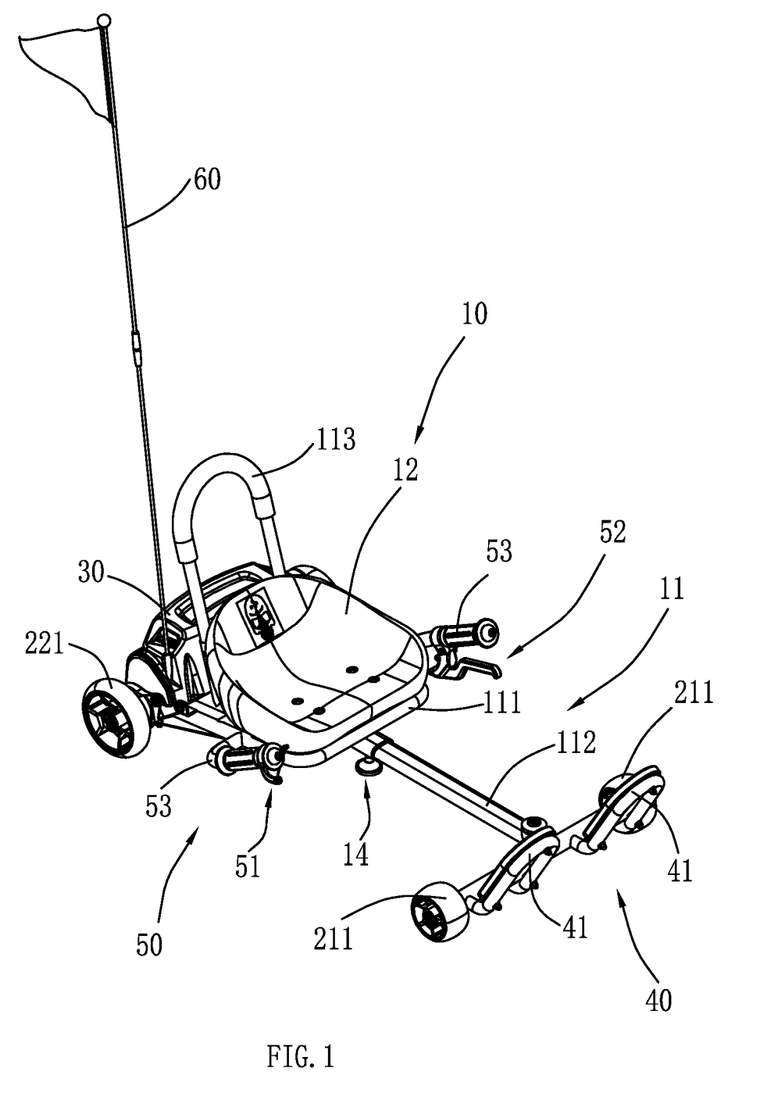
FIG. 1 is a perspective view of a miniature vehicle according to a preferred embodiment of the present invention.
Figure 2:
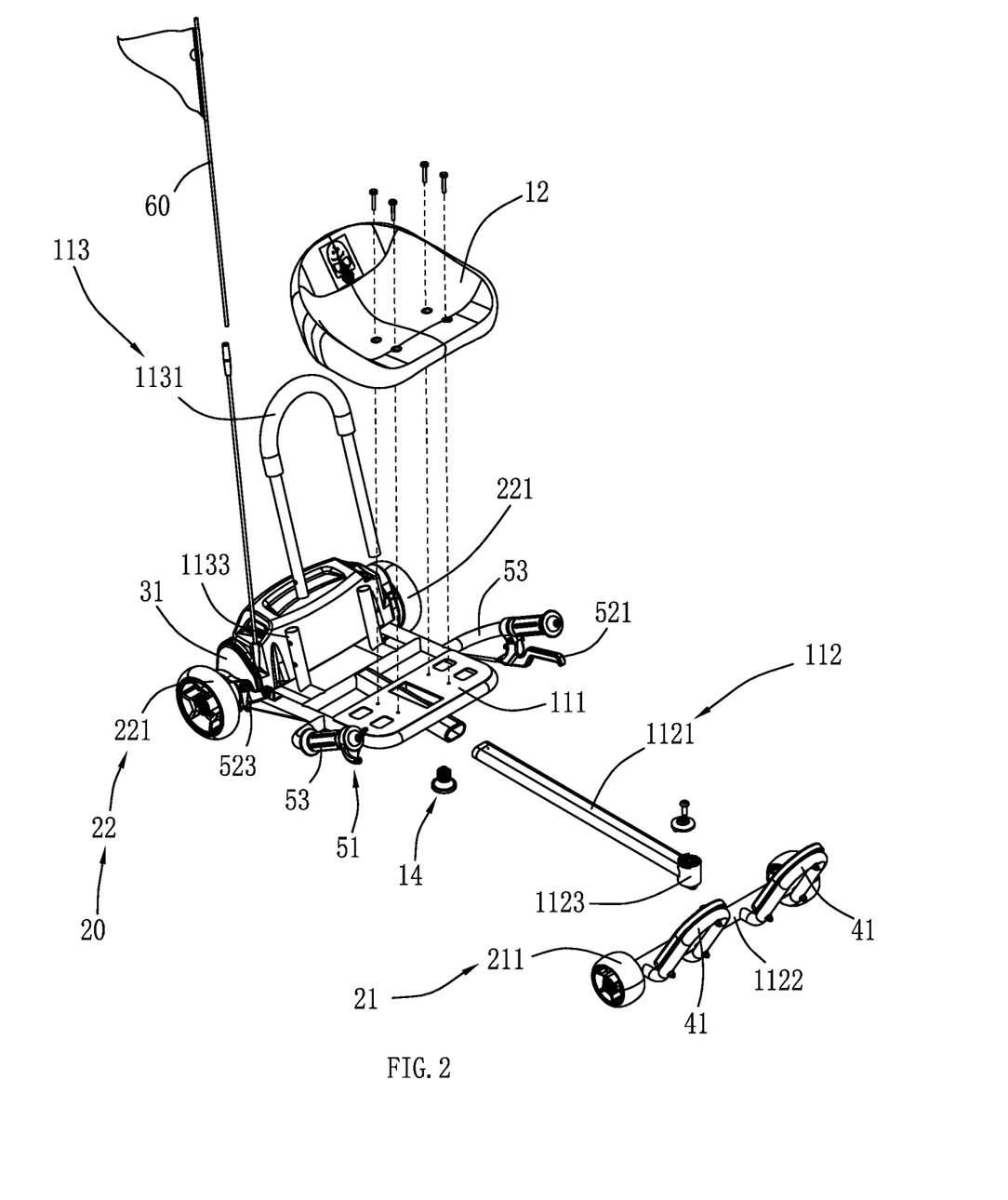
FIG. 2 is an exploded perspective view of the miniature vehicle according the above preferred embodiment of the present invention.

Referring to FIGS. 1 and 2 of the drawings, a miniature vehicle, or a go-kart according to a preferred embodiment of the present invention is illustrated, wherein the miniature vehicle comprises a vehicle frame 10, a wheel assembly 20, a motorized assembly 30, a foot steering arrangement 40, and a hand operational control 50.

According to the preferred embodiment, the vehicle frame 10 comprises a chassis frame 11 and a seat frame 12 supported thereon, wherein a user, or a rider/driver, is able to sit on the seat frame 12 for operating the miniature vehicle. In particular, the chassis frame 11 comprises a weight supporting base 111 and an extension frame 112 frontwardly extended from the weight supporting base 111.

The wheel assembly 20 comprises a front wheel assembly 21 and a rear wheel assembly 22 operatively coupled at front and rear ends of the chassis frame 11 respectively. Accordingly, the front wheel assembly 21 comprises two front wheels 211 spacedly and rotatably coupled at the extension frame 112. The rear wheel assembly 22 comprises two rear wheels 221 spacedly and rotatably coupled at the weight supporting base 111.

The motorized assembly 30 is supported on the chassis frame 11 to power the wheel assembly 20. In particular, the motorized assembly 30 is supported on the weight supporting base 111 at a position between the two rear wheels 221 to power the rear wheel assembly 22.

The foot steering arrangement 40 is operatively coupled to the wheel assembly 20 for steering operation by feet of the user. In particular, the foot steering arrangement 40 is operatively coupled to the front wheel assembly 21 to steer the miniature vehicle when the user sits on the seat frame 12.

The hand operational control 50 is operatively linked to the motorized assembly 30 for speed control of the miniature vehicle. In particular, the hand operational control 50 operatively linked to the motorized assembly 30 to control an output thereof and to the rear wheel assembly 22 to brake the rear wheels 221.

Figure 3:
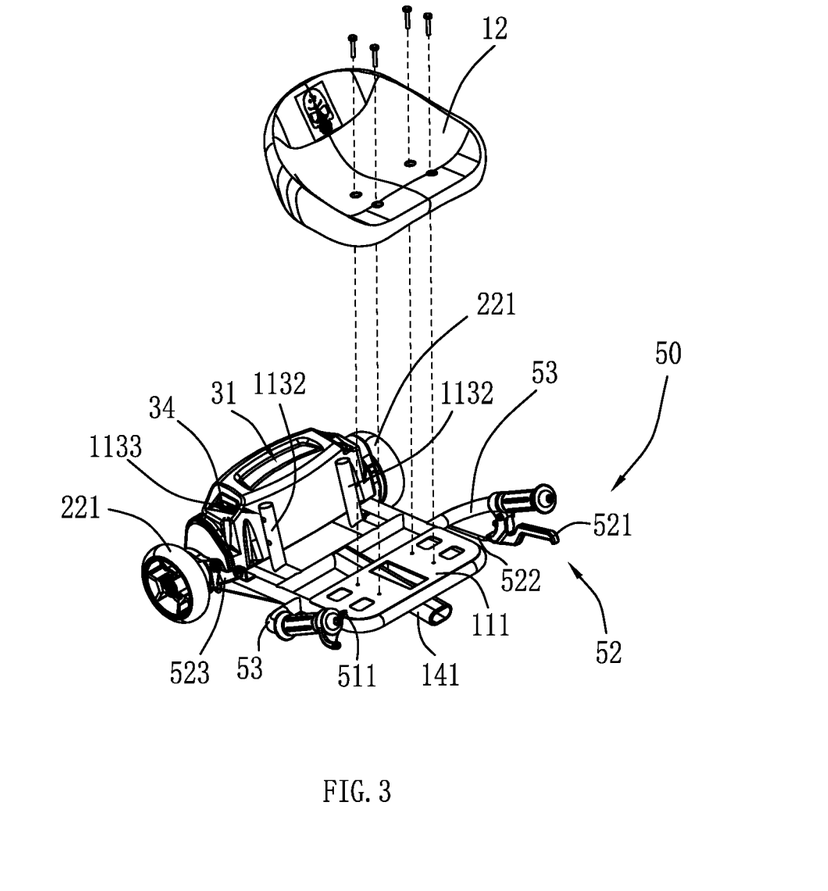
FIG. 3 is an exploded perspective view of the seat frame and the weight supporting base of the miniature vehicle according the above preferred embodiment of the present invention.

As shown in FIGS. 2 and 3, the weight supporting base 111 is made of rigid material, such as metal, for weight support. Accordingly, the weight supporting base 111 has a platform that supports the motorized assembly 30 and the seat frame 12 thereon, wherein the motorized assembly 30 is supported on the weight supporting base 111 at a position behind the seat frame 12. Therefore, when the user sits on the seat frame 12, the weight of the user will exert close to the mid-portion of the miniature vehicle to provide a better and even balance thereof when driving the miniature vehicle.

As shown in FIGS. 1-3 and 6, the chassis frame 11 further comprises a back support frame 113 upwardly extended from the weight supporting base 111 at a position between the motorized assembly 30 and the seat frame 12, such that when the user sits on the seat frame 12, the user is able lean back to support the user's back at the back support frame 113. In addition, the back support frame 113 is slidably coupled at the weight supporting base 111 to selectively adjust a height of the back support frame 113 to support the user's back. Accordingly, the back support frame 113 comprises a U-shaped back support 1131 and two tubular back guiders 1132 spacedly and upwardly extended from the weight supporting base 111, wherein two end portions of the back support 1131 are slidably inserted into the back guiders 1132 respectively. The back support frame 113 further comprises a plurality of back support locker slots 1133 spacedly formed along at least one of the back guiders 1132 and a spring-loaded locking pin 1134 provided at the corresponding end portion of the back support 1131, such that when the end portions of the back support 1131 are slidably inserted into the back guiders 1132 respectively, the spring-loaded locking pin 1134 is selectively engaged with one of the back support locker slots 1133 to lock up the back support 1131 with the back guiders 1132, so as to retain the height of the back support frame 113 with respect to the weight supporting base 111.

Figure 5:
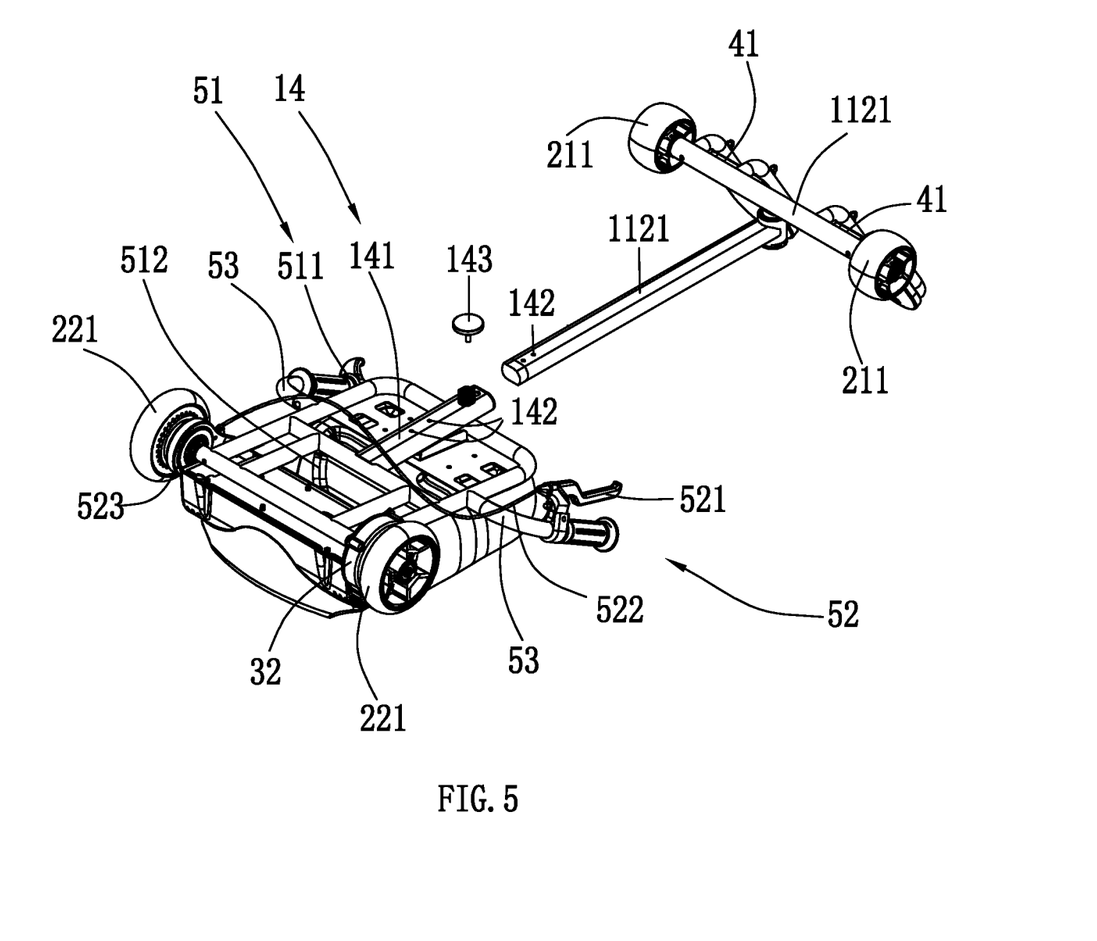
FIG. 5 is a bottom perspective view of the miniature vehicle according the above preferred embodiment of the present invention, illustrating the length adjustable locker.

As shown in FIGS. 2 and 5, the extension frame 112 is frontwardly extended from the weight supporting base 111 in a length-adjustable manner to selectively adjust a distance between the seat frame 12 and the front end of the extension frame 112 corresponding to the length of the user's leg. According to the preferred embodiment, the extension frame 112 comprises a leg extension 1121 frontwardly extended from the weight supporting base 111 and a steering control 1122 having a mid-portion pivotally connected to a front end of the leg extension 1121. In addition, the leg extension 1121 is slidably coupled to the weight supporting base 111 via a length adjustable locker 14 to selectively adjust the distance between the weight supporting base 111 and the steering control 1122.

Figure 8:
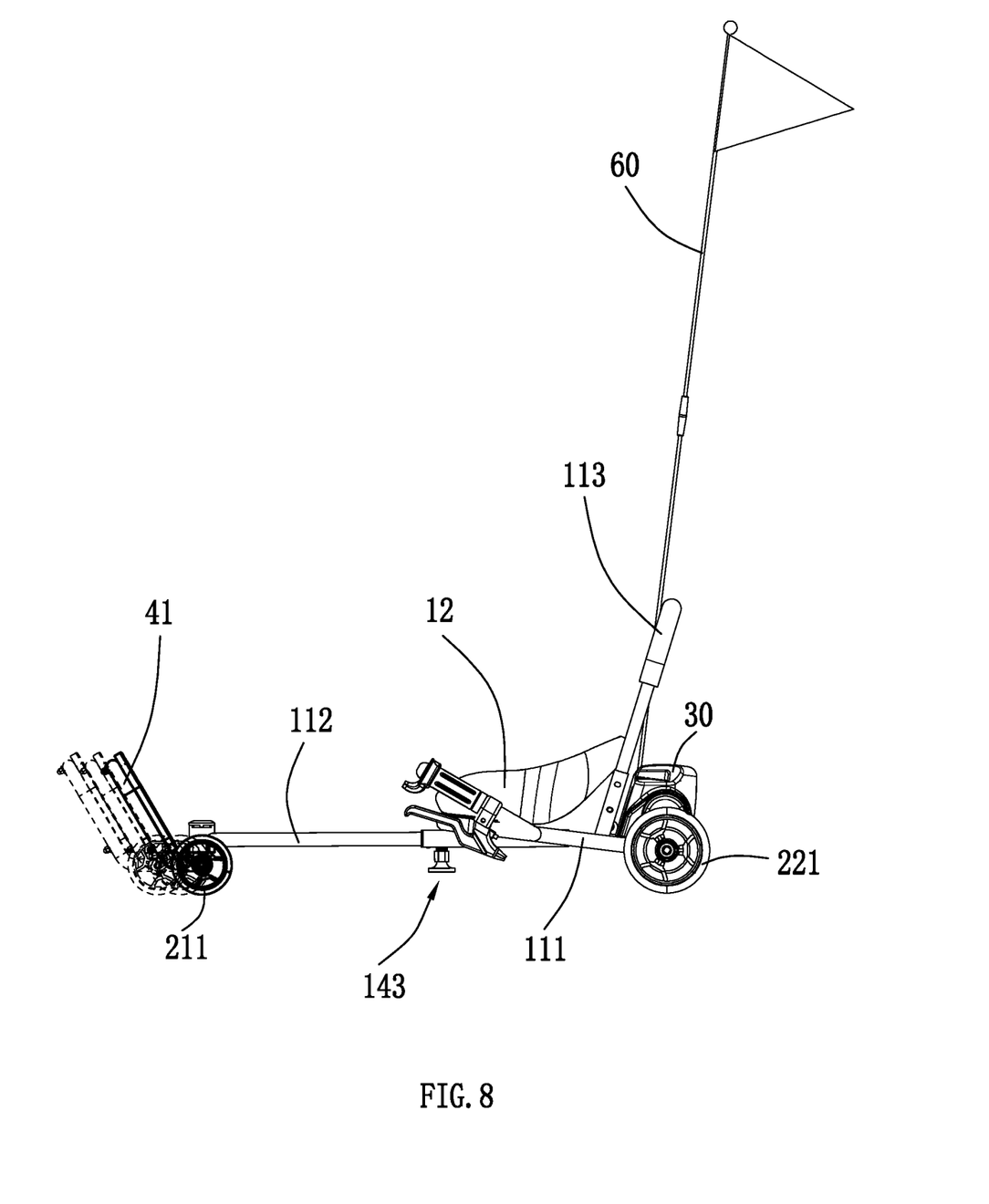
FIG. 8 illustrates the length adjustment of the leg extension of the miniature vehicle according the above preferred embodiment of the present invention.

As shown in FIG. 5, the length adjustable locker 14 comprises a tubular guider 141 frontwardly extended from the weight supporting base 111, a plurality of locker slots 142 spacedly formed at the tubular guider 141 and the leg extension 1121, and a hand actuating locker 143. Preferably, at least two of the locker slots 142 are spacedly formed at the tubular guider 141 and at least one locker slot 142 is formed at the leg extension 1121, such that when a rear end portion of the leg extension 1121 is slidably inserted into the tubular guider 141, at least one of the locker slot 142 at the tubular guider 141 is aligned with the locker slot 142 at the leg extension 1121. Once the locker slot 142 at the tubular guider 141 is aligned with the locker slot 142 at the leg extension 1121, the hand actuating locker 143 is rotatably engaged with the corresponding aligned locker slots 142 to lock up the leg extension 1121 at the tubular guider 141. It is worth mentioning that the distance between the seat frame 12 and the front end of the extension frame 112 is adjustable by selectively aligning the locker slot 142 at the tubular guider 141 with the locker slot 142 at the leg extension 1121, as shown in FIG. 8.

Figure 4:
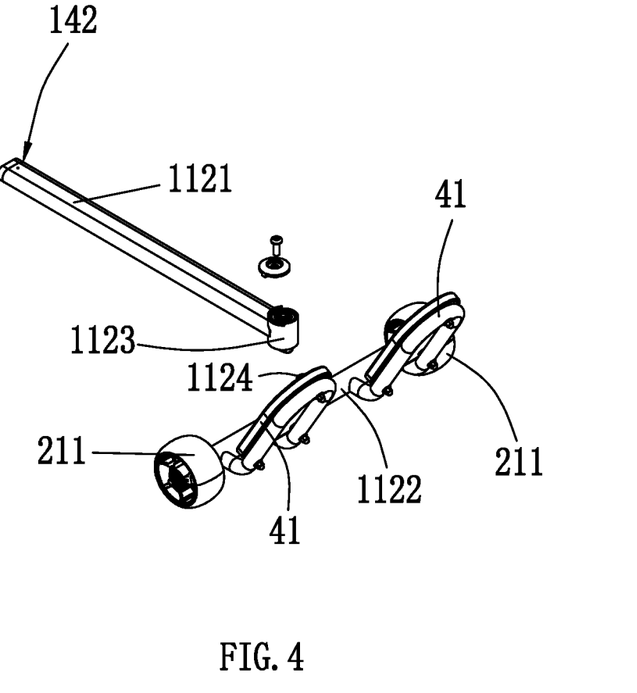
FIG. 4 is an exploded perspective view of the leg extension and the steering control of the miniature vehicle according the above preferred embodiment of the present invention.

In order to pivotally connect the steering control 1122 with the leg extension 1121, the leg extension 1121 comprises a tubular member 1123 integrally formed at the front end thereof and a steering shaft 1124 upwardly extended from the mid-portion of the steering control 1122 to coaxially engage with the tubular member 1123 so as to enable the steering control 1122 being pivotally connected to the front end of the leg extension 1121.

Figure 6:
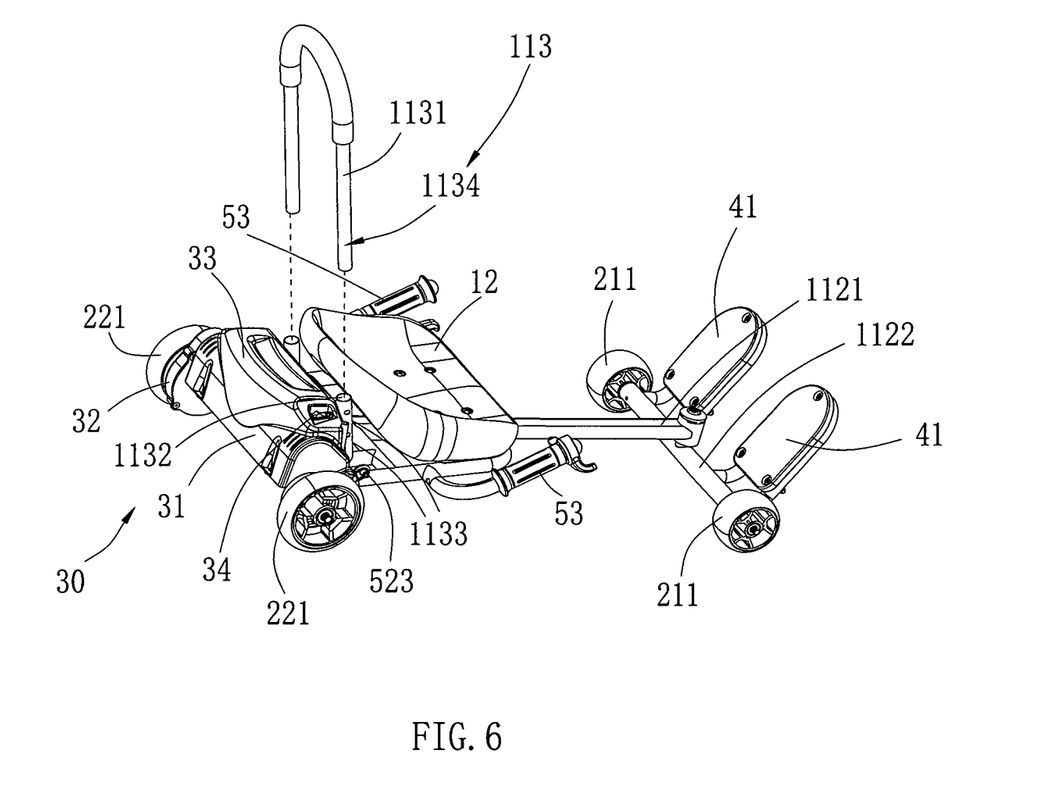
FIG. 6 is a rear perspective view of the miniature vehicle according the above preferred embodiment of the present invention, illustrating the back support frame.

As shown in FIGS. 2, 5 and 6, the motorized assembly 30 comprises an electric motor 31 and an output unit 32 operatively extended linked from the electric motor 31 to the rear wheel assembly 22. Accordingly, the output unit 32 can be an output shaft or an output gear operatively linked to one of the rear wheels 221 only. In other words, only one rear wheel 221 is powered by the electric motor 31 in order to propel the miniature vehicle. In other words, the miniature vehicle of the present invention is a rear wheel drive vehicle to provide a better acceleration of the vehicle.

Figure 7:
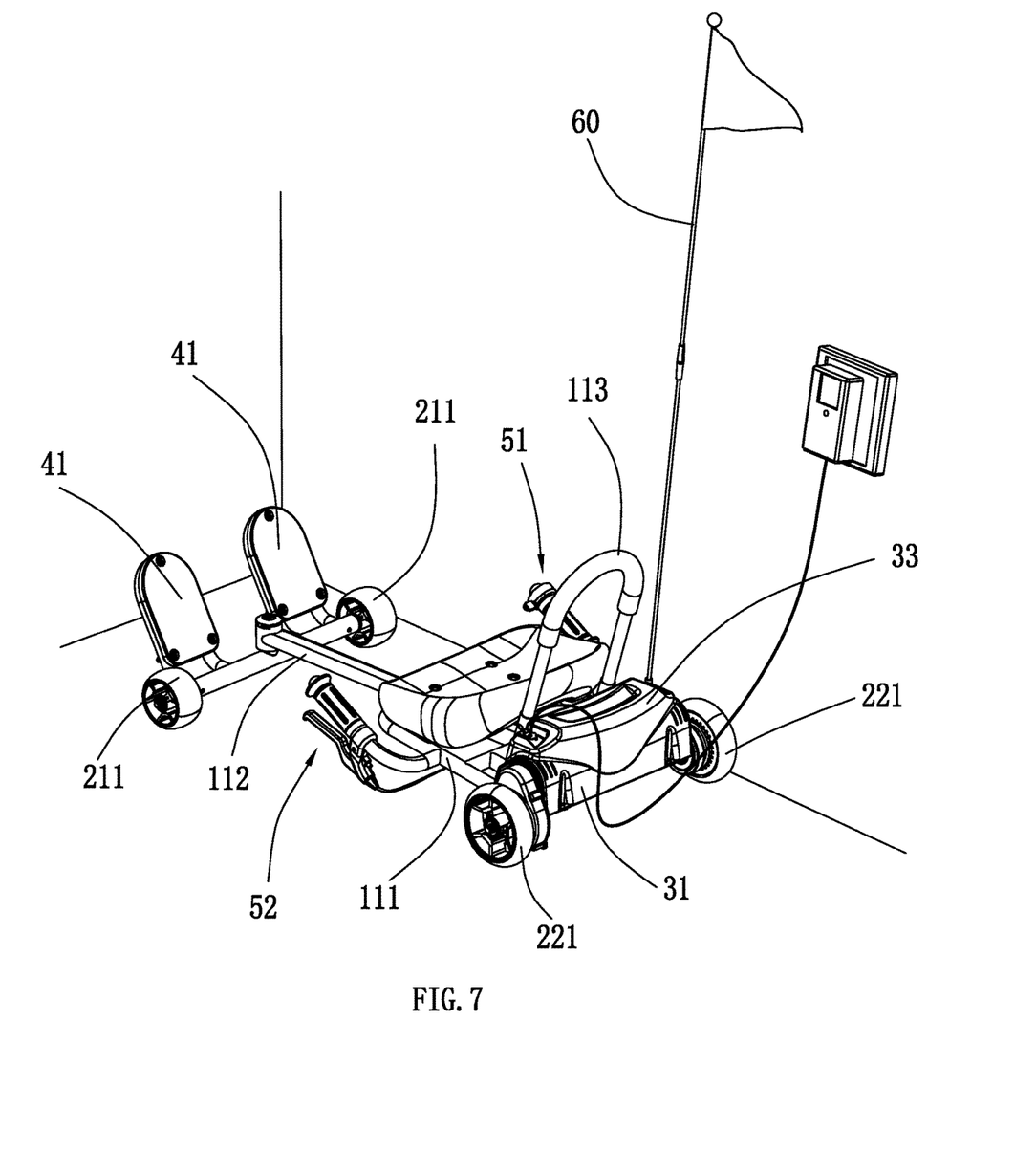
FIG. 7 illustrates the miniature vehicle being charged via a wall socket according the above preferred embodiment of the present invention.

The motorized assembly 30 further comprises a rechargeable battery 33 operatively linked to the electric motor 31, wherein the user is able to charge the rechargeable battery 33 as a power source of the miniature vehicle, as shown in FIG. 7. In addition, a power switch 34 is provided to power on or off the rechargeable battery 33. Since there is no emission during the operation, the miniature vehicle of the present invention is an environment friendly vehicle.

As shown in FIGS. 1, 4 and 6, the foot steering arrangement 40 comprises two foot steering pedals 41 spacedly coupled at the front end of the chassis frame 11 for the user's feet stepping on the foot steering pedals 41 respectively. In particular, the two foot steering pedals 41 are located between the two front wheels 211 as a right foot steering pedal and a left foot steering pedal.

Figure 9:
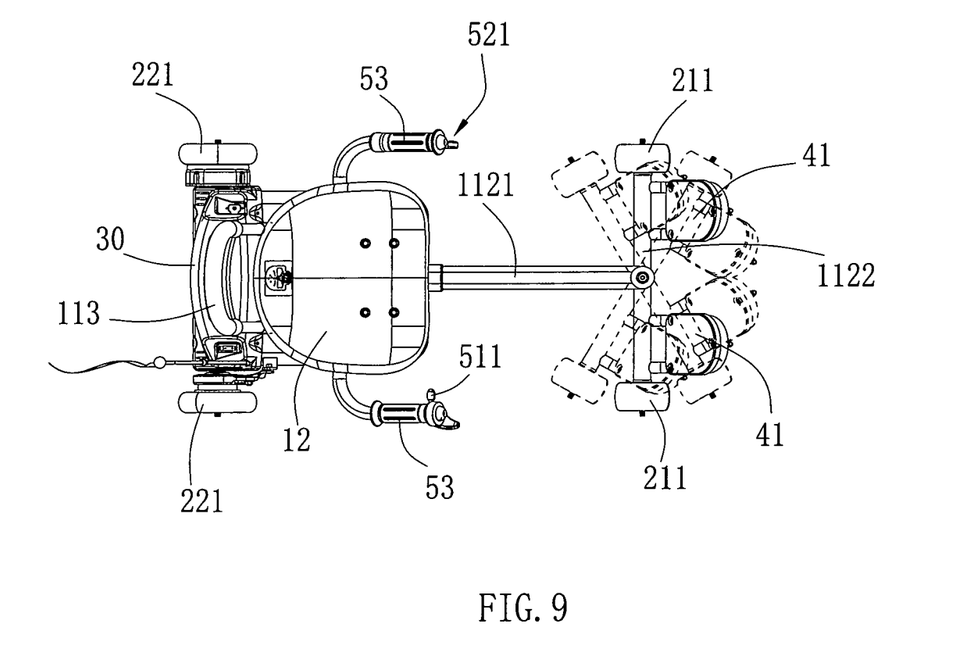
FIG. 9 illustrates the steering operation of the miniature vehicle according the above preferred embodiment of the present invention.

According to the preferred embodiment, the two front wheels 211 are rotatably coupled at two side ends of the steering control 1122 respectively. In addition, the two foot steering pedals 41 are spacedly coupled at the steering control 1122 at a position that the front end of the leg extension 1121 is positioned between the foot steering pedals 41 for the user's feet stepping on the foot steering pedals 41 respectively. In order to steer the miniature vehicle of the present invention, the user is able to place the feet on the foot steering pedals 41 respectively and selectively apply a pushing force on one of the foot steering pedals 41 by the user's foot, so as to pivotally move the steering control 1122, as shown in FIG. 9. When the user wants to steer the miniature vehicle to the right, the user is able to apply the pushing force on the left steering pedal 41. After turning, the user is able to apply the pushing force on the right steering pedal 41 to pivotally move the steering control 1122 back to the original position, i.e. the leg extension 1121 is perpendicular to the steering control 1122. Likewise, when the user wants to steer the miniature vehicle to the left, the user is able to apply the pushing force on the right steering pedal 41. In other words, the pushing force applied by the user's foot is directly control the positions of the front wheels 211 in order to precisely steer the miniature vehicle.

As shown in FIGS. 1 to 3, the hand operational control 50 is arranged to control the speed of the miniature vehicle by the user's hands, wherein the hand operational control 50 comprises a hand throttle control 51 operatively linked to the motorized assembly 30 and a hand brake control 52 operatively linked to the rear wheel assembly 22. Therefore, one hand of the user can hold the hand throttle control 51 to control the output of the motorized assembly 30 while another hand of the user is able to grip the hand brake control 52 to decelerate the miniature vehicle via the rear wheels 221.

According to the preferred embodiment, the hand operational control 50 further comprises two handle frames 53 extended from two sides of the chassis frame 11 respectively for enabling the user's hands to grip at the handle frames 53 in a hand down position when the user sits on the seat frame 12. In particular, the handle frames 53 are extended from two side of the weight supporting frame 111 at a position that the seat frame 12 is positioned between the handle frames 53, such that when the user sits on the seat frame 12, the user's hands can naturally drop down to grip the handle frames 53. Accordingly, the hand throttle control 51 and the hand brake control 52 are coupled at the handle frames 53 respectively.

As shown in FIGS. 1, 5 and 9, the hand throttle control 51 comprises a thumb switch 511 coupled at one of the handle frames 53 to controllably operate the motorized assembly 30 when the thumb switch 511 is pressed by the user's thumb. Accordingly, the thumb 511 is operatively connected to the motorized assembly 30 via a control cable 512 extending therebetween. Therefore, when the thumb switch 511 is pressed, the output of the motorized assembly 30 will be increased to drive the rear wheels 221 to rotate. Once the pressing force on the thumb switch 511 is released, the output of the motorized assembly 30 will be reduced or idle to slow down the miniature vehicle.

The hand brake control 52 comprises a brake lever 521 pivotally coupled at the other handle frame 53 and a brake cable 522 extended from the brake lever 521 to the rear wheel assembly 22, such that when the brake lever 521 is pivotally pressed or squeezed, a brake unit 523 is actuated to frictionally engaged with the rear wheel 221 to slow down the miniature vehicle. Preferably, the thumb switch 511 is coupled at the right handle frame 53 to control the output unit 32 for the left rear wheel 221. The brake lever 521 is coupled at the left handle frame 53 to control the brake unit 523 to frictionally engaged with the right rear wheel 221.

Figure 10:
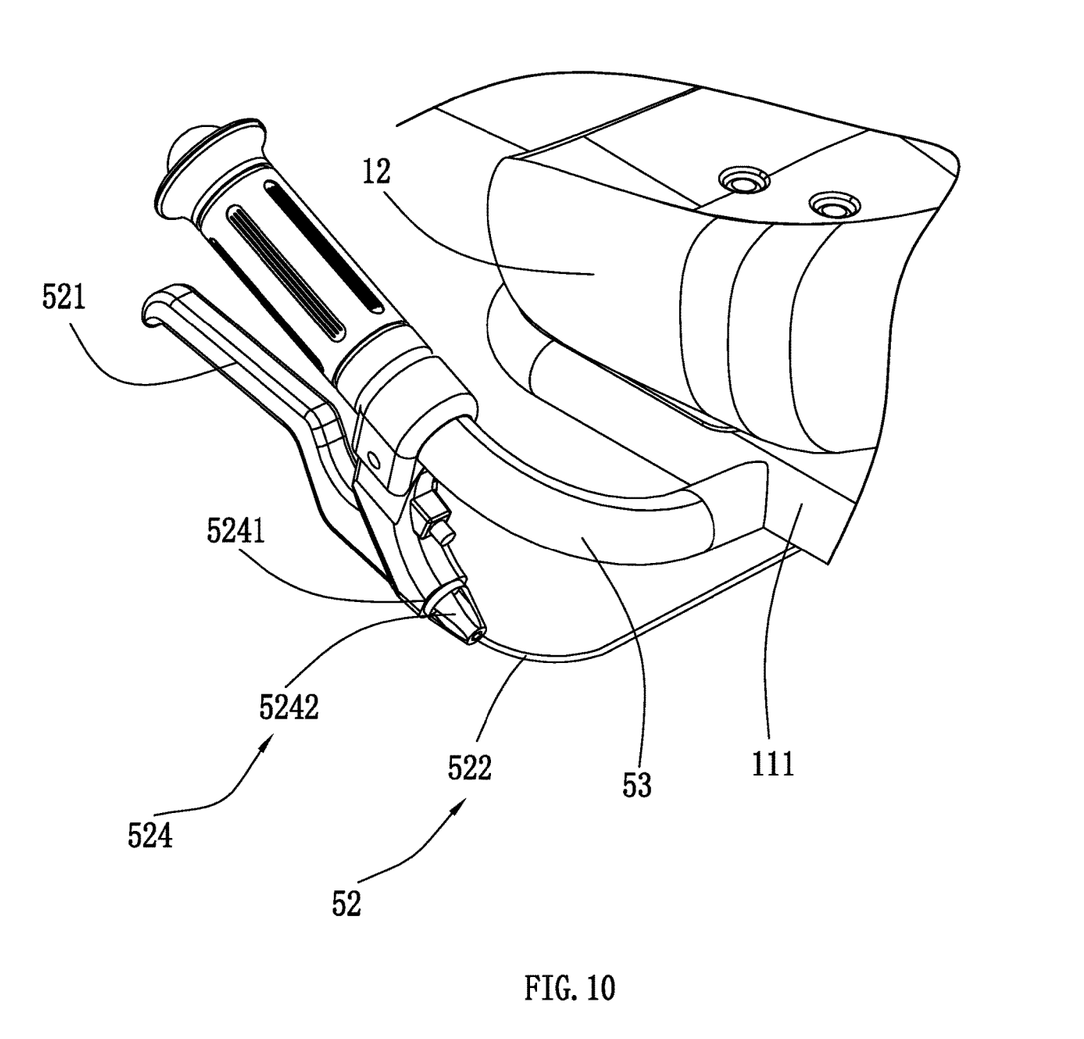
FIG. 10 illustrates the brake adjustment of the miniature vehicle according the above preferred embodiment of the present invention.

The hand brake control 52 further comprises a brake adjustment 524 operatively coupled between the brake lever 521 and the brake cable 522 to selectively adjust a brake feeling of the brake lever 521. As shown in FIG. 10, the brake adjustment 524 comprises a cable lock 5241 releasably retaining a cable tension of the brake cable 522 between the brake lever 521 and the brake unit 523, and a tension adjuster 5242 rotatably coupled to the cable lock 5241 to adjust the cable tension of the brake cable 522. In one embodiment, in order to adjust the brake feeling of the brake lever 521, i.e. the cable tension of the brake cable 522, the cable lock 5241 can be rotated at one direction to release the cable tension of the brake cable 522. It is worth mentioning that no pressing force is applied at the brake lever 521 when the cable lock 5241 is actuated. Then, the tension adjuster 5242 is rotated to adjust the cable tension of the brake cable 522. For example, the tension adjuster 5242 is rotated at the clockwise direction to loosen the cable tension of the brake cable 522 and is rotated at the counter-clockwise direction to tighten the cable tension of the brake cable 522. Preferably, the tension adjuster 5242 is initially rotated at the counter-clockwise direction to tighten the cable tension of the brake cable 522. Then, the tension adjuster 5242 is rotated at the clockwise direction to gradually loosen the cable tension of the brake cable 522. During the tension adjustment, the user must ensure that the rear wheel 221 can be freely rotated without pressing the brake lever 521. Once the brake cable 522 is adjusted to a desired cable tension, i.e. the desired brake feeling of the brake lever 521, the cable lock 5241 can be rotated at the opposed direction to lock the cable tension of the brake cable 522.

The miniature vehicle of the present invention further comprises a location indicator 60 to indicate the driving location of the miniature vehicle. Accordingly, the location indicator 60 can be an indicating flag detachably mounted to the vehicle frame 10 to indicate the driving location of the miniature vehicle during the operation. It is worth mentioning that since the user must lean back on the miniature vehicle when sitting on the seat frame 12 to substantially lower the center of mass of the vehicle during the operation, the location indicator 60 is important to indicate location of the moving vehicle.

Alternatively, the location indicator 60 can be a flash light or a sound generator to indicate location of the moving vehicle.

According to the preferred embodiment, the miniature vehicle of the present invention provides a maximum wheelbase to enhance the stabilization of the vehicle during operation by locating the front wheels 211 at the very front end of the chassis frame 11 and the rear wheels 221 at the very rear end of the chassis frame 11. In addition, the user is able to lean back on the miniature vehicle when sitting on the seat frame 12 to substantially lower the center of mass of the vehicle during the operation. The user is able to control the speed of the miniature vehicle by the hands that the right hand of the user is able to control the operation of the electric motor 31 and the left hand of the user is able to control the brake operation. The feet of the user can control the steering of the miniature vehicle. Therefore, the operation of the miniature vehicle of the present invention is relatively simple and easy. It can be a recreational vehicle for a kid to ride.

Preferably, the user must wear a helmet, knee pads and elbow pads for safety in order to drive the miniature vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A miniature vehicle, comprising:
a vehicle frame which comprises, a back frame, a chassis frame and a seat frame supported thereon for a user sitting on said seat frame;
front and rear wheel assemblies operatively coupled at front and rear ends of said chassis frame respectively;
a motorized assembly supported on said chassis frame to power said rear wheel assembly; and
a foot steering arrangement operatively coupled to said front wheel assembly for steering operation by feet of the user, wherein said chassis frame comprises a weight supporting base that supports said motorized assembly and said seat frame position in front of said motorized assembly at a position that said back frame is upwardly extended between said motorized assembly and said seat frame, and an extension frame frontwardly extended from said weight supporting base to operatively couple with said foot steering arrangement, wherein said extension frame comprises a leg extension frontwardly extended from said weight supporting base and a steering control having a mid-portion pivotally connected to a front end of said leg extension, wherein said leg extension is slidably extended from said weight supporting base to selectively adjust a distance between said weight supporting base and said front end of said leg extension, wherein said leg extension is slidably coupled to said weight supporting base via a length adjustable locker which comprises a tubular guider frontwardly extended from said weight supporting base, a plurality of locker slots spacedly formed at said tubular guider and said leg extension, and a hand actuating locker arranged in such a manner that when a rear end portion of said leg extension is slidably inserted into said tubular guider to align said locker slot at said leg extension with one of said locker slots at said tubular guider, said hand actuating locker is rotatably engaged with said corresponding locker slots to lock up said leg extension at said tubular guider, wherein said front wheel assembly comprises two front wheels rotatably coupled at two side ends of said steering control, wherein said leg extension comprises a tubular member integrally formed at said front end of said leg extension and a steering shaft upwardly extended from said mid-portion of said steering control to coaxially engage with said tubular member so as to enable said steering control being pivotally connected to said front end of said leg extension, such that a pivotal connection between said leg extension and said steering control is formed between said two front wheels.

2. A miniature vehicle, comprising:
a vehicle frame which comprises, a back frame, a chassis frame and a seat frame supported thereon for a user sitting on said seat frame;
front and rear wheel assemblies operatively coupled at front and rear ends of said chassis frame respectively;
a motorized assembly supported on said chassis frame to power said rear wheel assembly; and
a foot steering arrangement operatively coupled to said front wheel assembly for steering operation by feet of the user, wherein said chassis frame comprises a weight supporting base that supports said motorized assembly and said seat frame position in front of said motorized assembly at a position that said back frame is upwardly extended between said motorized assembly and said seat frame, and an extension frame frontwardly extended from said weight supporting base to operatively couple with said foot steering arrangement, wherein said extension frame comprises a leg extension frontwardly extended from said weight supporting base and a steering control having a mid-portion pivotally connected to a front end of said leg extension, wherein said foot steering arrangement comprises two foot steering pedals spacedly coupled at said steering control at a position that said front end of said leg extension is positioned between said foot steering pedals for the user's feet stepping on said foot steering pedals respectively, wherein said front wheel assembly comprises two front wheels rotatably coupled at two side ends of said steering control respectively, wherein said leg extension is slidably extended from said weight supporting base to selectively adjust a distance between said weight supporting base and said front end of said leg extension, wherein said leg extension is slidably coupled to said weight supporting base via a length adjustable locker which comprises a tubular guider frontwardly extended from said weight supporting base, a plurality of locker slots spacedly formed at said tubular guider and said leg extension, and a hand actuating locker arranged in such a manner that when a rear end portion of said leg extension is slidably inserted into said tubular guider to align said locker slot at said leg extension with one of said locker slots at said tubular guider, said hand actuating locker is rotatably engaged with said corresponding locker slots to lock up said leg extension at said tubular guider, wherein said leg extension comprises a tubular member integrally formed at said front end of said leg extension and a steering shaft upwardly extended from said mid-portion of said steering control to coaxially engage with said tubular member so as to enable said steering control being pivotally connected to said front end of said leg extension, such that a pivotal connection between said leg extension and said steering control is formed between said two front wheels.

3. A miniature vehicle, comprising:
a vehicle frame which comprises a chassis frame and a seat frame supported thereon for a user sitting on said seat frame;
front and rear wheel assemblies operatively coupled at front and rear ends of said chassis frame respectively;
a motorized assembly supported on said chassis frame to power said rear wheel assembly; and
a foot steering arrangement operatively coupled to said front wheel assembly for steering operation by feet of the user, wherein said motorized assembly comprises an electric motor and an output unit operatively linked from said electric motor to said rear wheel assembly, wherein said rear wheel assembly comprises two rear wheels rotatably and spacedly coupled at said rear end of said chassis frame that said output unit is operatively linked to one of said rear wheels only, wherein said front wheel assembly comprises two front wheels rotatably coupled at two side ends of said steering control, wherein said leg extension comprises a tubular member integrally formed at said front end of said leg extension and a steering shaft upwardly extended from said mid-portion of said steering control to coaxially engage with said tubular member so as to enable said steering control being pivotally connected to said front end of said leg extension, such that a pivotal connection between said leg extension and said steering control is formed between said two front wheels.

4. The miniature vehicle, as recited in claim 3, wherein said motorized assembly further comprises a rechargeable battery operatively linked to said electric motor.

5. A miniature vehicle, comprising:
a vehicle frame which comprises, a back frame, a chassis frame and a seat frame supported thereon for a user sitting on said seat frame;
front and rear wheel assemblies operatively coupled at front and rear ends of said chassis frame respectively;
a motorized assembly supported on said chassis frame to power said rear wheel assembly, wherein said motorized assembly is positioned behind said seat frame that said back frame is upwardly extended between said motorized assembly and said seat frame;
a foot steering arrangement operatively coupled to said front wheel assembly for steering operation by feet of the user, and
a hand operational control for speed control by the user's hands, wherein said chassis frame comprises a weight supporting base that supports said motorized assembly and said seat frame, and an extension frame frontwardly extended from said weight supporting base to operatively couple with said foot steering arrangement, wherein said extension frame comprises a leg extension frontwardly extended from said weight supporting base and a steering control having a mid-portion pivotally connected to a front end of said leg extension, wherein said foot steering arrangement comprises two foot steering pedals spacedly coupled at said steering control at a position that said front end of said leg extension is positioned between said foot steering pedals for the user's feet stepping on said foot steering pedals respectively, wherein said front wheel assembly comprises two front wheels rotatably coupled at two side ends of said steering control respectively, wherein said hand operational control comprises a hand throttle control operatively linked to said motorized assembly and a hand brake control operatively linked to said rear wheel assembly, wherein said hand operational control further comprises two handle frames extended from two sides of said chassis frame respectively for enabling the user's hands to grip at said handle frames in a hand down position, wherein said hand throttle control and said hand brake control are coupled at said handle frames respectively, wherein said hand throttle control comprises a thumb switch coupled at one of said handle frames to controllably operate said motorized assembly when said thumb switch is pressed by the user's thumb, wherein said hand brake control comprises a brake lever pivotally coupled at one of said handle frames, a brake cable extended from said brake lever to said rear wheel assembly, and a brake adjustment operatively coupled between said brake lever and said brake cable to selectively adjust a brake feeling of said brake lever, wherein said motorized assembly comprises an electric motor and an output unit operatively linked from said electric motor to said rear wheel assembly, wherein said rear wheel assembly comprises two rear wheels rotatably and spacedly coupled at said rear end of said chassis frame that said output unit is operatively linked to one of said rear wheels only, wherein said front wheel assembly comprises two front wheels rotatably coupled at two side ends of said steering control, wherein said leg extension comprises a tubular member integrally formed at said front end of said leg extension and a steering shaft upwardly extended from said mid-portion of said steering control to coaxially engage with said tubular member so as to enable said steering control being pivotally connected to said front end of said leg extension, such that a pivotal connection between said leg extension and said steering control is formed between said two front wheels.

6. The miniature vehicle, as recited in claim 5, wherein said motorized assembly further comprises a rechargeable battery operatively linked to said electric motor.

\* \* \* \* \*